United States Patent
Van Stralen et al.

(10) Patent No.: US 7,866,188 B2
(45) Date of Patent: Jan. 11, 2011

(54) PCVD APPARATUS WITH A CHOKE DEFINED WITHIN A MICROWAVE APPLICATOR

(75) Inventors: Mattheus Jacobus Nicolaas Van Stralen, Tilburg (NL); Rob Hubertus Matheus Deckers, Eindhoven (NL)

(73) Assignee: Draka Comteq, B.V., Amsterdam (NL)

( * ) Notice: Subject to any disclaimer, the term of this patent is extended or adjusted under 35 U.S.C. 154(b) by 1216 days.

(21) Appl. No.: 11/024,778

(22) Filed: Dec. 30, 2004

(65) Prior Publication Data

US 2005/0172902 A1  Aug. 11, 2005

(30) Foreign Application Priority Data

Dec. 30, 2003 (NL) .................................. 1025155

(51) Int. Cl.
*C03B 37/018* (2006.01)
(52) U.S. Cl. .............................. 65/391; 65/425; 65/417; 65/529; 65/530
(58) Field of Classification Search .................. 65/391, 65/425, 417, 529, 530
See application file for complete search history.

(56) References Cited

U.S. PATENT DOCUMENTS

| | | | |
|---|---|---|---|
| 4,221,680 A * | 9/1980 | Hardwick et al. ............. | 588/11 |
| 4,314,833 A | 2/1982 | Kuppers | |
| 4,844,007 A | 7/1989 | Eikelboom | |
| 4,877,938 A | 10/1989 | Rau et al. | |
| 6,260,510 B1 | 7/2001 | Breuls et al. | |
| 6,408,649 B1 * | 6/2002 | Sklyarevich et al. .......... | 65/102 |
| 2003/0115909 A1 | 6/2003 | House et al. | |
| 2003/0159781 A1 | 8/2003 | Van Stralen et al. | |
| 2005/0172902 A1 | 8/2005 | Van Stralen et al. | |

FOREIGN PATENT DOCUMENTS

| | | |
|---|---|---|
| EP | 0 261 742 A1 | 3/1988 |
| EP | 0 270 157 A1 | 6/1988 |
| EP | 0 554 845 A1 | 8/1993 |
| EP | 1550640 B1 | 5/2007 |
| FR | 2 584 101 | 1/1987 |
| WO | WO 99/35304 | 7/1999 |

(Continued)

OTHER PUBLICATIONS

Metaxas & Meredith, "Industrial Microwave Heating", 1983, Peter Peregrinus Ltd., pp. 277-295, 336.*

(Continued)

*Primary Examiner*—John Hoffmann
(74) *Attorney, Agent, or Firm*—Summa, Additon & Ashe, P.A.

(57) ABSTRACT

The present invention relates to an apparatus for carrying out a PCVD deposition process, wherein one or more doped or undoped layers are coated onto the interior of a glass substrate tube, which apparatus comprises an applicator having an inner and an outer wall and a microwave guide which opens into the applicator, which applicator extends around a cylindrical axis and which is provided with a passage adjacent to the inner wall, through which the microwaves can exit, over which cylindrical axis the substrate tube can be positioned, and wherein at least one choke of annular shape having a length l and a width w is centred around the cylindrical axis within the applicator.

18 Claims, 4 Drawing Sheets

FOREIGN PATENT DOCUMENTS

WO    03/049141 A3    6/2003

OTHER PUBLICATIONS

European Search Report for counterpart European Application No. 04078524, dated Apr. 8, 2005 [resubmitted image].

Dutch Search Report for counterpart Dutch Application No. 1025155, dated Dec. 30, 2003 [resubmitted image].

European Office Action in counterpart European Application No. 04078524, dated Mar. 3, 2006 [Reference WO 99/35304 previously cited in an IDS filed on Apr. 15, 2005].

Decision to grant a European patent in counterpart European Application No. 04078524, dated Jul. 5, 2007.

* cited by examiner microwave generator

PCVD APPARATUS WITH A CHOKE DEFINED WITHIN A MICROWAVE APPLICATOR

FIELD OF THE INVENTION

The present invention relates to an apparatus for carrying out a PCVD deposition process, wherein one or more doped or undoped layers are deposited onto the interior of a glass substrate tube, which apparatus comprises an applicator having an inner and an outer wall and a microwave guide which opens into the applicator, which applicator extends around a cylindrical axis and which is provided with a passage adjacent to the inner wall, through which the microwaves can exit, over which cylindrical axis the substrate tube can be positioned, and wherein at least one choke of annular shape having a length l and a width w is centred around the cylindrical axis within the applicator. The present invention furthermore relates to a method of manufacturing a preform, which method comprises carrying out a PCVD deposition process for the purpose of depositing one or more doped or undoped layers onto the interior of a glass substrate tube and subsequently thermally collapsing the substrate tube thus formed so as to produce a preform.

BACKGROUND OF THE INVENTION

One way of manufacturing an optical preform is the plasma chemical vapour deposition (PCVD) process, which is known from U.S. Pat. No. 4,314,833 granted in the name of the present applicant. According to the process that is known therefrom, one or more doped or undoped vitreous layers are coated onto the interior of a substrate tube, using a low-pressure plasma in the glass substrate tube. After the vitreous layers have been coated onto the interior of the glass substrate tube, the glass substrate tube is subsequently collapsed into a solid rod through the application of heat. In a special embodiment, an additional amount of glass may be externally coated onto the massive rod, for example by means of an external vapour deposition process or by using one or more preformed glass tubes, providing a composite preform. From the preform thus obtained, optical fibres are obtained by heating one end thereof.

According to International application WO 99/35304 filed in the name of the present applicants, microwaves from a microwave generator are carried to an applicator via a waveguide, which applicator surrounds the glass substrate tube. The applicator causes high-frequency energy to be coupled into the plasma. The reactive gases, which may or may not be doped, are supplied to one side of the substrate tube, after which a reaction takes place under the influence of the plasma and doped or undoped vitreous layers are deposited on the interior of the substrate tube. The other side of the substrate tube is connected to a vacuum pump, so that a reduced pressure, generally a pressure ranging from 5 to 50 mbar, is generated in the substrate tube. The applicator is moved back and forth in the longitudinal direction of the substrate tube, and a thin vitreous layer is deposited on the interior of the substrate tube with every stroke. The applicator and the substrate tube are generally surrounded by a furnace so as to maintain the substrate tube at a temperature of 900-1300° C. during the deposition process.

SUMMARY OF THE INVENTION

To increase the production capacity of the PCVD process, it is desirable to increase the rate at which the doped or undoped layers are deposited onto the interior of the glass substrate tube. However, the increase of the deposition rate requires that the high-frequency energy needed for dissociating the reactive, vitrifying gases in the plasma increases proportionally. The present inventors have found that leakage of high-frequency power becomes increasingly problematic when high-frequency power levels upwards of about 2.5 kW are used. The consequence of such leakage is an inefficient energy consumption. In addition, ambient radiation usually occurs, which may interfere with the operation of electronic equipment present in the vicinity thereof. In addition to that, the leakage of radiation to operating staff is undesirable for medical reasons. The present inventors have furthermore found that such leakage of high-frequency energy may result in the formation of a standing wave in the substrate tube, leading to a risk that a sinusoidal disruption in the deposition of the vitreous layers along the length of the substrate tube will occur, which is undesirable.

The object of the present invention is thus to provide an apparatus and a method for carrying out a PCVD deposition process wherein power levels upwards of 2.5 kW can suitably be used without any of the aforesaid drawbacks occurring.

Another object of the present invention is to provide an apparatus for carrying out a PCVD deposition process wherein in particular the amount of leakage radiation during operation of such a PCVD apparatus is less than 100 W/m$^2$, measured at a distance of 5 cm from the apparatus.

The invention as referred to in the introduction is characterized in that the length l of the choke is smaller than or equal to the quarter-wavelength, which quarter-wavelength corresponds to a quarter-wavelength in the Cartesian coordinate system, the length l being defined as the difference between the overall length of the choke b and the length of the radius of the inner wall a of the applicator, both measured in a direction perpendicular to the cylindrical axis.

The present inventors have in particular found that the leakage of high-frequency energy from the applicator during the deposition of the vitreous layers can be reduced by using a choke having a special geometry and/or choice of materials. Although the presence of the choke is known per se, for example from International applications WO 99/35304 and WO 03/049141 filed in the name of the present applicants, no special numbers, conditions and/or dimensions of the choke are known from said documents, let alone that such numbers, conditions and/or dimensions can be derived therefrom. From International application WO 99/35304 it is known, for example, that the choke may take the form of an annular λ/4 waveguide, wherein the choke is centred on the cylindrical axis and is positioned such that it is located in close proximity to the two ends of the resonator cavity.

The present inventors have found that too much high-frequency energy can leak out when a power level of about 2.5 kW is used. According to the present inventors, said leakage also depends on the thickness of the layer being deposited in the substrate tube, and they have observed that the effect of the "quarter-wavelength choke" that is known from the prior art decreases as the thickness of the deposited layer increases. In other words, the total thickness of the vitreous layers increases during the deposition process, so that it is desirable to develop a configuration of the choke(s) that will lead to an optimum result both at the beginning and at the end of the deposition process. On the basis of this finding, the present inventors have realised that the effect of the choke can be optimised by using a choke length smaller than a quarter-wavelength, as defined in the appended claims.

The term "quarter-wavelength" as used herein is understood to mean the length in the coordinate system being used that corresponds to one quarter of a wavelength in the Cartesian coordinate system. Since the choke in the cylindrical applicator that is used in the present method and apparatus is a cylindrical space that surrounds the substrate tube, a cylindrical coordinate system is used for determining the quarter-wavelength. When microwaves having a frequency of 2.45 GHz are used, the wavelength will be 122 mm. The length of a cylindrical quarter-wavelength choke can be calculated by means of the following equation:

$$\frac{H_0^{(2)}(k_0 \cdot n \cdot b)}{H_0^{(1)}(k_0 \cdot n \cdot b)} = \frac{H_1^{(2)}(k_0 \cdot n \cdot a)}{H_1^{(1)}(k_0 \cdot n \cdot a)}$$

wherein:
$H_\nu^{(1)}$, $H_\nu^{(2)}$=Hankel functions
$k_0$=wave number in vacuum,
n=refractive index of material used for filling the choke.
where $$k_0 = \frac{2 \cdot \pi \cdot f}{c_0}$$

f=microwave frequency
$c_0$=light velocity in vacuum
a=radius inner wall applicator
b=choke radius.

In a special embodiment of the present apparatus, the apparatus comprises at least two separate chokes, each having a length l which is smaller than or equal to the quarter-wavelength, which quarter-wavelength corresponds to a quarter-wavelength in the Cartesian coordinate system, the length l being defined as the difference between the overall length of the choke b and the length of the radius of the inner wall a of the applicator, both measured from the cylindrical axis. The present inventors found that the application of a filler in the choke will have an influence on the absorption of the microwaves. This will result in a better performance of the choke.

In a special embodiment the chokes may furthermore differ in length l, providing that each individual length l is smaller than or equal to the quarter-wavelength, which quarter-wavelength corresponds to a quarter-wavelength in the Cartesian coordinate system, the length l being defined as the difference between the overall length of the choke b and the length of the radius of the inner wall a of the applicator, both measured in a direction perpendicular to the cylindrical axis.

It should be understood that in such an embodiment only one choke may be present on one side of the resonator. According to another possibility, however, a choke is present on either side of the resonator. If desired, a few chokes may be present on one side of the resonator, which chokes may differ in length, in which case each length l must meet the aforesaid length requirement, however. According to another possibility, however, a few chokes are positioned on either side of the resonator, in which case the aforesaid requirement as regards the length l applies for each choke.

The intensity of the plasma in the interior of the substrate tube can be further enhanced by configuring the smallest spacing between two chokes positioned on either side of an applicator such that said spacing is smaller than $\lambda$, wherein $\lambda$ is the wavelength of the microwave radiation that is being used. According to such an embodiment, a more intense plasma is obtained, which will provide a more efficient conversion of the starting materials in the present PCVD process.

In a specific embodiment, the overall length of the choke can be increased by a multiple of $\lambda/2$, wherein $\lambda$ is the wavelength of the microwaves being used, without the effect thereof being adversely affected.

The present inventors have furthermore found that it is possible to design so-called compact applicators by extending the configuration of the choke in longitudinal direction, which choke is characterized in that the annular shape of the choke is configured such that it comprises a radial space and a longitudinal space, which longitudinal space, which is annular in shape, is spaced from the cylindrical axis by a distance l'', extending along said cylindrical axis, and which has a length m, measured parallel to the cylindrical axis, and which comprises an inner wall and an outer wall, wherein l'' is defined as the dimension of the radius of the inner wall measured in a direction perpendicular to the cylindrical axis.

According to such a special construction, the overall length of the choke, viz. the length l'' (perpendicular to the cylindrical axis) plus the length m (parallel to the cylindrical axis), is preferably smaller than or equal to the quarter-wavelength, which quarter-wavelength corresponds to a quarter-wavelength in the Cartesian coordinate system.

Another embodiment of the present invention comprises the construction of a so-called adaptive choke whose length l can be varied. According to such a construction, a device which is movable in a direction parallel to the cylindrical axis is preferably present in the longitudinal space, wherein the distance over which the microwaves move within the choke can be adapted by changing the dimension of the longitudinal space by means of such a device. An adjusting element may be used as said device, with the choke for example being connected, via a guide, to a device comprising a movable plunger, which makes it possible to change the distance over which the microwaves move within the device. In addition, in a special embodiment of the present invention it is also possible to fill the choke with a material whose refractive index may be varied due to magnetic field, a current or a voltage, for example. An example of such a filling material is ferrite, which material has a refractive index which can be changed under the influence of magnetic field.

Using such a choke, it is possible to adapt the length of the choke as a function of time during the entire deposition process, thus minimising the leakage of high-frequency energy independently of the deposition of the vitreous layers whilst at the same time ensuring a maximum concentration of high-frequency energy in the plasma.

In a special embodiment, the radial space of the choke is furthermore preferably positioned at an angle of 90 degrees with respect to the longitudinal space of the choke.

In a preferred embodiment the applicator is preferably cylindrically symmetrical and annular in shape, comprising a resonator cavity which extends cylindrically symmetrically round the cylindrical axis and which is annular in shape, said resonator cavity comprising a slit that extends in a full circle round the cylindrical axis, through which slit the microwave energy from the microwave guide is transported. It is in particular desirable for the microwave guide to open into the resonator cavity. It is furthermore preferable in that connection for the waveguide to have a longitudinal axis that extends substantially perpendicularly to the cylindrical axis, which longitudinal axis does not intersect the slit or the passage, more in particular, which does not divide the resonator cavity into two equal halves.

Further special embodiments of the present invention are defined in the sub claims and discussed in more detail in the description of the figures.

The present invention further relates to a method of manufacturing a preform, comprising the carrying out of a PCVD deposition process for depositing one or more doped or undoped layers onto the interior of a glass substrate tube, after which a solid preform is formed by thermally collapsing the glass substrate tube thus obtained, which method is characterized in that the PCVD deposition process is carried out in an apparatus as defined above, wherein the substrate tube is positioned over the cylindrical axis, within the inner wall of the resonator cavity, with the substrate tube and the resonator cavity being substantially coaxial, which resonator cavity is moved back and forth along the length of a substrate tube.

According to such a method, the losses of high-frequency energy are minimised during the entire deposition process, resulting in a more efficient energy consumption.

The use of a preform thus obtained makes it possible to draw an optical fibre therefrom by heating one end of the preform.

To ensure a satisfactory effect of the adaptive chokes as discussed above, it is possible to provide such chokes with a measuring and control system, wherein the amount of energy that leaks out is measured in or near the applicator, after which the choke is adapted in dependence thereon.

The leakage of high-frequency energy in a range in which such energy is used can be further minimised by providing the furnace, in which the substrate tube is maintained at a temperature of 800-1300° C. during the PCVD deposition process, with a metal shell. The special problems that occur when using such a PCVD process are in particular the sealing of the slit in the furnace through which the waveguide for the resonator moves, and the sealing of the positions at which the substrate tube passes through the furnace. In particular, the slit in the furnace through which the waveguide that carries the high-frequency energy to the applicator moves must be covered by a metal shell, which metal shell moves along with the applicator. To prevent leakage of radiation from the furnace at the positions at which the substrate tube projects from the furnace, the substrate tube is preferably surrounded at said positions by a cylindrical waveguide having a cut-off wavelength which is smaller than the microwave length that is being used. An example of this is a metal tube, for which it applies that the internal diameter is less than $c_0/(1,706 \times f)$, wherein $c_0$ is the velocity of light and f is the frequency of the microwaves. With a microwave frequency of 2.45 GHz, the tube diameter must thus be smaller than 71.7 mm, wherein such a metal tube may be built up of two opposing parts. In a special embodiment, said waveguide may be provided with one or more chokes, which is desirable in particular when using higher power levels upwards of 5 kW in order to prevent leakage of radiation into the environment.

In a special embodiment, the inner wall of the furnace may furthermore be provided with a layer that absorbs microwave radiation, for example a layer of siliciumcarbide (SiC). The thickness of such a layer is preferable in agreement with $\lambda/4$ (at a certain geometry and refractive index of said material). An additional advantage of such a construction is that the microwave radiation is converted into heat, as a result of which less energy needs to be supplied to the furnace.

The present invention will be explained in more detail hereinafter with reference to a number of figures, in which connection it should be noted, however, that the present invention is by no means limited to such a special figure.

DETAILED DESCRIPTION OF THE INVENTION

Figure 1A:
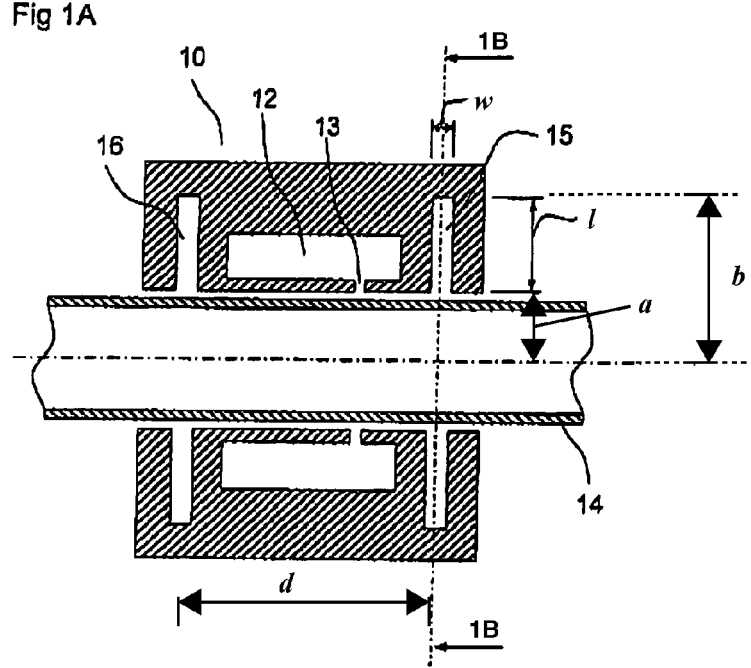
FIG. 1A schematically shows an applicator according to the present invention.
Figure 1B:
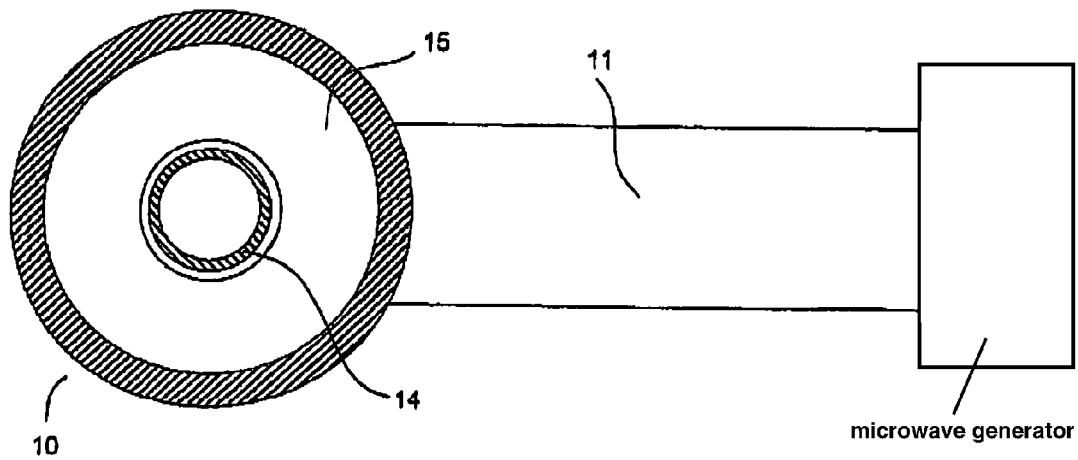
FIG. 1B shows the applicator of FIG. 1A in sectional view.

FIGS. 1A and 1B show an example of an applicator as used in the present PCVD process. Microwaves from a microwave generator are carried to an applicator 10 via a waveguide 11. Via a resonator cavity 12 and a slit 13 in the applicator, the high-frequency energy from the microwaves is coupled into a plasma which is present in the substrate tube 14 near the resonator cavity 12. Present in the applicator are chokes 15, 16, which prevent leakage of high-frequency energy. By using a length l for the chokes smaller than the quarter-wavelength, the effect of the choke is optimised. For practical reasons, the width w of a choke is usually selected to be smaller than the length l or the choke and larger than about 3 mm. If two separate chokes 15, 16 are used, as is shown in FIG. 1A, the spacing d between the two chokes 15, 16 is maximally $\lambda$.

Figure 2:
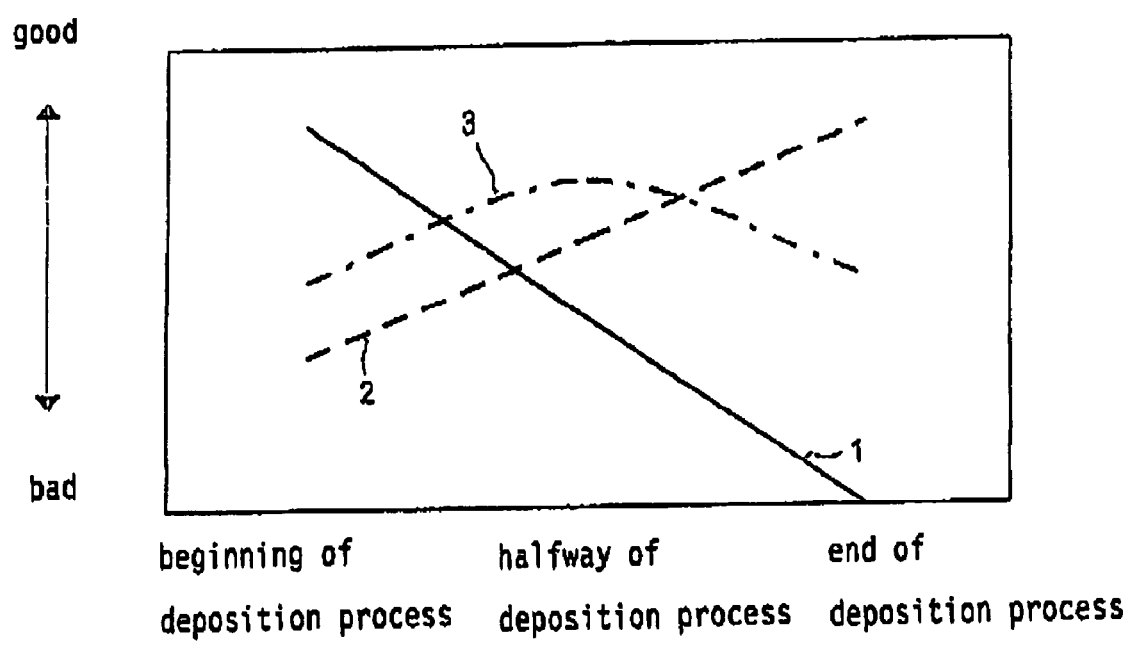
FIG. 2 shows the effect of a number of chokes during the deposition process as a function of the process time with various values of the length l.

FIG. 2 shows the effect of chokes of different length l during the deposition of layers on the inner wall of a glass substrate tube. The full line shows the effect of a conventional choke having a length l of 37 mm, which corresponds to a length of a quarter-wavelength choke with a microwave radiation of 2.45 GHz and an internal radius a of the applicator of 19 mm (the "$\lambda/4$ choke" that is known from the prior art). It is apparent that a satisfactory effect is obtained only at the beginning of the deposition process, but that considerable losses of high-frequency energy occur at the end of the deposition process, which losses are undesirable. The broken line shows the effect of a choke having a length of 30 mm (=80% of the "$\lambda/4$ choke"). In this case the effect of the choke is acceptable at the beginning of the deposition process and better than that of the conventional choke at the end of the deposition process. A choke having a length of 33 mm (=89% of the "$\lambda/4$ choke") as illustrated by the dotted line provides the best effect at a point halfway the deposition process, and exhibits an optimized behaviour during the entire deposition process. Chokes having a length of less than 20 mm (=54% of the "$\lambda/4$ choke") (not shown) have an overall effect which is less favourable than that of a conventional "$\lambda/4$ choke". The effect of a choke having a length greater than the quarter-wavelength (not shown) is less than that of the "$\lambda/4$ choke" over the entire deposition range.

Figure 3:
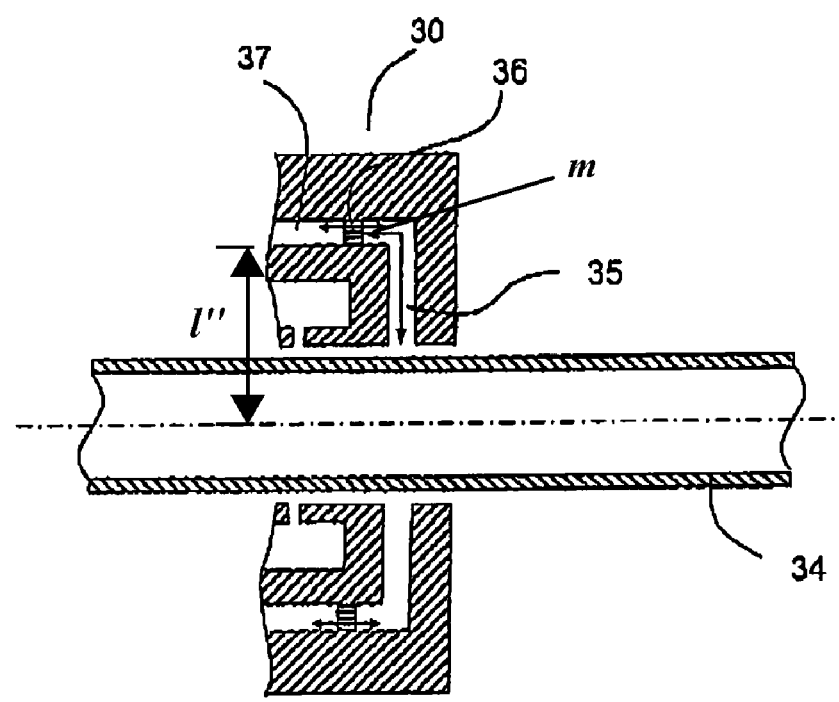
FIG. 3 schematically shows an adaptive choke according to the present invention.

The choke effect can be improved even further by placing different chokes of a length smaller than the quarter-wavelength one behind another in an applicator. The inventors have furthermore found that it is possible to design compact applicators by extending the space of which a choke consists in longitudinal direction. An example of such a design is shown in FIG. 3. The length l of the adaptive choke that is shown therein comprises the length of the choke in radial direction plus the length in longitudinal direction. According to such an adaptive choke design, the length l can be adapted during the deposition process, in such a manner that the leakage of high-frequency energy is minimised independently of the stage of the deposition process and that a maximum concentration of high-frequency energy in the plasma is effected.

FIG. 3 schematically shows a resonator 30, in which the length l of a choke 35 is adapted by moving a device 36 back and forth in the choke's longitudinal space 37. Said back and forth movement of the device 36 can be effected by means of oil pressure or water pressure, or by means of a screw thread construction. A substrate tube 34 is positioned over the cylindrical axis defined by the resonator 30.

Figure 4:
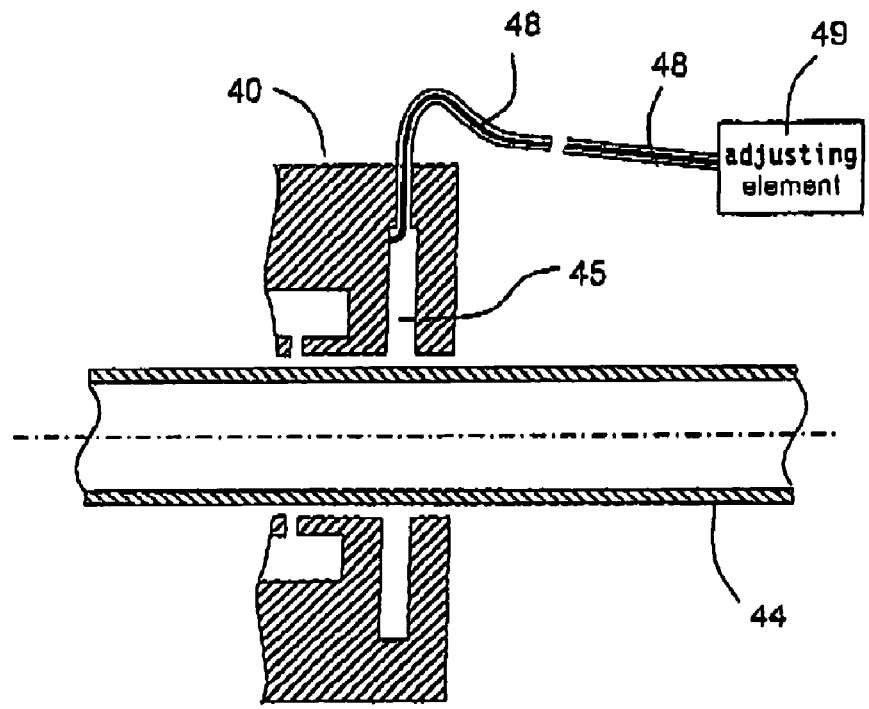
FIG. 4 shows a special embodiment of an adaptive choke.

FIG. 4 schematically shows another embodiment of an adaptive choke 45 positioned within a resonator 40, which choke 45 is connected by means of a waveguide 48 to an adjusting element 49 whose operation is based on microwave reflection during the PCVD deposition process onto the interior of the glass substrate tube 44. The effect of the choke can be optimised by varying the position at which said reflection takes place at the end of a so-called coax structure. An example of such an adjusting element is a coax structure in which a movable plunger is present. Other adjusting elements may be formed by, for example, a branch in which such a movable plunger is present, or a movable pin of a metal, for example, which extends radially into the coax structure.

Figure 5:
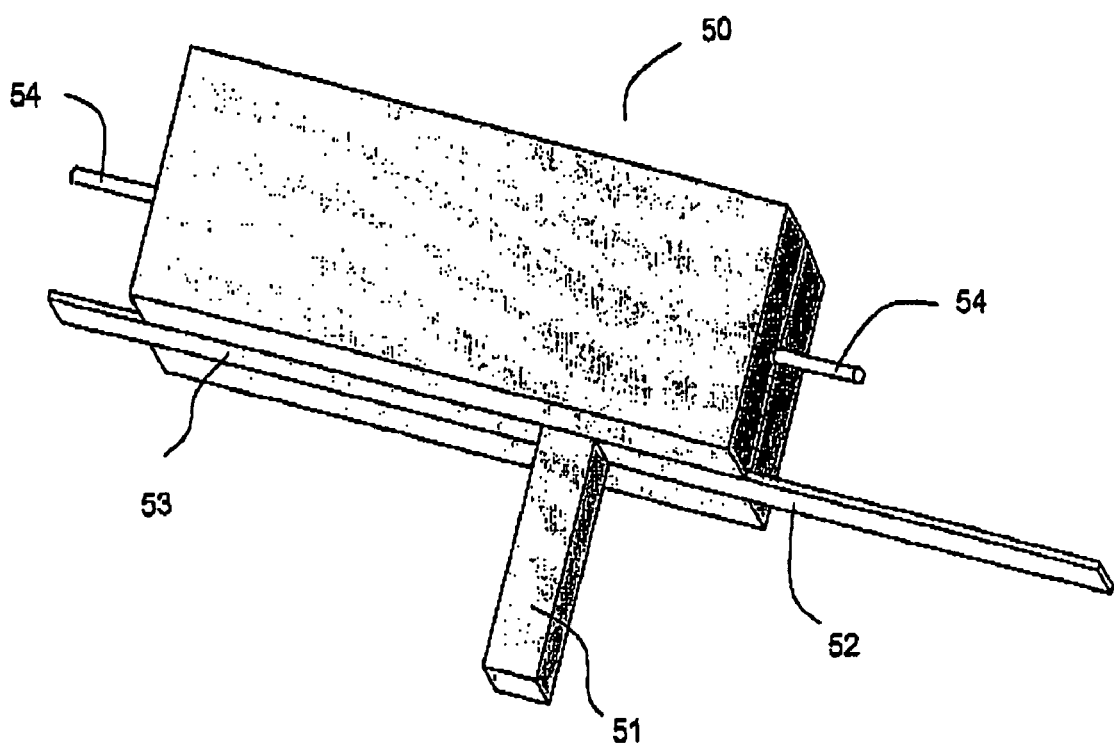
FIG. 5 schematically shows a furnace in which the PCVD process is carried out.

FIG. 5 schematically shows a furnace that is used for maintaining the glass substrate tube at a temperature of 800-1300° C. during the PCVD deposition process, which furnace is provided with a metal shell. From said figure it follows that the slit in the furnace 50 through which the waveguide 51 that carries the high-frequency energy to the applicator moves is covered by a metal shell, which metal shell moves along with the applicator. Thus an applicator that surrounds the substrate tube 54 is present in the furnace 50. High-frequency energy is carried to the applicator by means of the waveguide 51, which waveguide 51 can move back and forth in the furnace 50 as a result of the presence of a slit in the furnace 50. The furnace 50 is provided with a metal shell, which prevents leakage of high-frequency energy into the environment. It is in particular desirable for the slit through which the waveguide 51 moves to be covered by plates 52, 53, which plates 52, 53 are likewise provided with a metal shell, so that leakage of high-frequency energy through a slit in the furnace is not possible. Such plates 52, 53 ensure that the furnace 50 is closed at any position of the applicator and the waveguide 51, in such a manner that leakage of high-frequency energy is not possible.

The invention claimed is:

1. A PCVD apparatus, comprising:
   (i) a cylindrical applicator having an inner cylindrical wall defining an interior cylindrical space, the interior cylindrical space itself defining a central, cylindrical axis;
   (ii) a microwave generator that produces microwave energy at a wavelength $\lambda$;
   (iii) a waveguide for transmitting the microwave energy to said applicator; and
   (iv) a choke at least partly defined within said applicator, wherein the length of said choke (l) is defined in accordance with the following equation:

$$l = b - a,$$

wherein
   a=the radius of said applicator's inner cylindrical wall as measured from the central, cylindrical axis defined by said applicator's cylindrical interior space, and
   b=the overall length of said choke as measured from the central, cylindrical axis defined by said applicator's cylindrical interior space; and
   wherein the length of said choke (l) is less than the length of a theoretical quarter-wavelength choke in accordance with the following equation:

$$(0.60\, L_{\lambda/4}) \leq l \leq (0.89\, L_{\lambda/4}),$$

wherein
   $L_{\lambda/4}$=the length of the theoretical quarter-wavelength choke
   as defined in accordance with the following equation:

$$L_{\lambda/4} = b' - a,$$

wherein
   a=the radius of the applicator's inner cylindrical wall as measured from the central, cylindrical axis defined by the applicator's cylindrical interior space, and
   b'=the calculated overall choke length of the theoretical quarter-wavelength choke as derived, in the cylindrical coordinate system, from the following equations:

$$\frac{H_0^{(2)} \cdot (k_0 \cdot n \cdot b')}{H_0^{(1)} \cdot (k_0 \cdot n \cdot b')} = \frac{H_1^{(2)} \cdot (k_0 \cdot n \cdot a)}{H_1^{(1)} \cdot (k_0 \cdot n \cdot a)}$$

$H_\nu^{(1)}$, $H_\nu^{(1)}$=Hankel functions,
   n=refractive index of choke filler material, if any, and
   $k_0$=wave number in a vacuum of the microwave energy having a wavelength $\lambda$, where $$k_0 = \frac{2 \cdot \pi \cdot f}{c_0}$$

f=frequency of the microwave energy, and
   $c_0$=velocity of light in a vacuum.

2. A PCVD apparatus according to claim 1, comprising one or more additional chokes at least partly defined within said applicator, wherein the respective length of each said additional choke is described by the following equation:

$$(0.60\, L_{\lambda/4}) \leq l \leq (0.89\, L_{\lambda/4}).$$

3. A PCVD apparatus according to claim 2, wherein each said choke is spaced from an adjacent choke by no more than $\lambda$, the wavelength of the microwave energy produced by said microwave generator.

4. A PCVD apparatus according to claim 2, wherein at least two of said chokes have equal lengths.

5. A PCVD apparatus according to claim 2, wherein at least two of said chokes have different lengths.

6. A PCVD apparatus according to claim 1, wherein said choke comprises a radial space and a longitudinal space that are configured at an angle of about 90 degrees with respect to one another.

7. A PCVD apparatus according to claim 6, wherein said choke is an adaptive choke that permits the length of said choke (l) to be changed between 0.60 and 0.89 of the length of the theoretical quarter-wavelength choke ($L_{\lambda/4}$) during a PCVD process.

8. A PCVD apparatus according to claim 1, wherein said choke has a width (w) of more than 3 millimeters but less than its length (l).

9. A PCVD apparatus according to claim 1, further comprising a resonator cavity defined within said applicator, said resonator cavity in communication with said waveguide and said applicator's interior cylindrical space.

10. A PCVD apparatus according to claim 1, wherein said choke is filled with a microwave-absorbing material.

11. A PCVD apparatus according to claim 1, wherein said choke is filled with a material having a refractive index that can be varied.

12. A PCVD apparatus according to claim 11, wherein said choke is filled with a material having a refractive index that can be varied using electric current, voltage, and/or magnetic field.

13. A PCVD apparatus according to claim 1, wherein said choke is an adaptive choke that permits the length of said choke (l) to be changed between 0.60 and 0.89 of the length of the theoretical quarter-wavelength choke ($L_{\lambda/4}$) during a PCVD process.

14. A PCVD apparatus according to claim 1, wherein said waveguide for transmitting the microwave energy to said applicator is positioned substantially perpendicular to the central, cylindrical axis defined by said applicator's cylindrical interior space.

15. A PCVD apparatus according to claim 1, wherein, relative to the central, cylindrical axis defined by said applicator's cylindrical interior space, the length of said choke (l) is defined only by a length in one direction.

16. A PCVD apparatus according to claim 15, wherein, relative to the central, cylindrical axis defined by said applicator's cylindrical interior space, the length of said choke (l) is defined only by a perpendicular length in a radial direction.

17. A PCVD apparatus according to claim 1, wherein, relative to the central, cylindrical axis defined by said applicator's cylindrical interior space, the length of said choke (l) is defined by lengths in more than one direction.

18. A PCVD apparatus according to claim 17, wherein, relative to the central, cylindrical axis defined by said applicator's cylindrical interior space, the length of said choke (l) is defined by the sum of a perpendicular length in a radial direction and a parallel length in a longitudinal direction.

* * * * *